(12) United States Patent
Müller et al.

(10) Patent No.: US 10,071,341 B2
(45) Date of Patent: Sep. 11, 2018

(54) ELIMINATION OF AMMONIA AND LOWER ALKANES AND/OR HYDROGEN FROM WASTE GAS STREAMS IN INDUSTRIAL PLANTS

(71) Applicant: THYSSENKRUPP INDUSTRIAL SOLUTIONS AG, Essen (DE)

(72) Inventors: Ivo Müller, Dortmund (DE); Meinhard Schwefer, Meschede (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/759,097

(22) PCT Filed: Dec. 20, 2013

(86) PCT No.: PCT/EP2013/003900
§ 371 (c)(1),
(2) Date: Jul. 2, 2015

(87) PCT Pub. No.: WO2014/106533
PCT Pub. Date: Jul. 10, 2014

(65) Prior Publication Data
US 2015/0343376 A1    Dec. 3, 2015

(30) Foreign Application Priority Data

Jan. 2, 2013 (DE) .......................... 10 2013 000 013

(51) Int. Cl.
*B01D 53/86* (2006.01)
(52) U.S. Cl.
CPC ....... *B01D 53/8634* (2013.01); *B01D 53/864* (2013.01); *B01D 53/869* (2013.01);
(Continued)
(58) Field of Classification Search
None
See application file for complete search history.

(56) References Cited

U.S. PATENT DOCUMENTS 2,601,221 A * 6/1952 Cohn .................. B01J 23/40
                                                  252/375
3,607,022 A    9/1971 Hausweiler et al.
(Continued)

FOREIGN PATENT DOCUMENTS

DE    69530024 T2    12/2003
EP      514729 B1     4/1996
(Continued)

OTHER PUBLICATIONS

PCT/EP2013/003900 International Search Report dated Apr. 28, 2014, 7 pages.
Machine Translation of DE 695 30 024 T2.

*Primary Examiner* — Sheng Han Davis
(74) *Attorney, Agent, or Firm* — Lathrop Gage L.L.P.

(57) ABSTRACT

Methods for the combined elimination of both ammonia and lower alkanes and/or hydrogen, which are contained in one or more waste gas streams in an industrial plant, are disclosed herein. The method is effectuated by combined oxidation and reduction according to the reduction-oxidation process, wherein the ammonia and the lower alkanes and/or hydrogen are completely or partially reacted by chemical reaction to form nitrogen, carbon dioxide and water. The waste gas stream containing ammonia and lower alkanes and/or hydrogen is passed over one or more catalysts for the combined oxidation and reduction, and the oxygen content in the waste gas stream is set in such a way that ammonia and the lower alkanes and/or hydrogen are oxidized first in an oxidation zone to form nitrogen, carbon dioxide and water, and the nitrogen oxides resulting therefrom are subsequently reduced in a reduction zone to form elemental nitrogen.

13 Claims, 11 Drawing Sheets

(52) U.S. Cl.
CPC .... *B01D 53/8671* (2013.01); *B01D 2251/102* (2013.01); *B01D 2251/11* (2013.01); *B01D 2251/202* (2013.01); *B01D 2251/208* (2013.01); *B01D 2255/106* (2013.01); *B01D 2255/1021* (2013.01); *B01D 2255/1023* (2013.01); *B01D 2255/1025* (2013.01); *B01D 2255/207* (2013.01); *B01D 2255/2092* (2013.01); *B01D 2255/30* (2013.01); *B01D 2255/50* (2013.01); *B01D 2257/108* (2013.01); *B01D 2257/406* (2013.01); *B01D 2257/7022* (2013.01)

(56) References Cited

U.S. PATENT DOCUMENTS

| | | | |
|---|---|---|---|
| 5,230,877 A | 7/1993 | Eimer | |
| 5,746,052 A * | 5/1998 | Kinugasa | B01D 53/9431 422/171 |
| 6,015,533 A * | 1/2000 | Young | G01N 33/0009 204/428 |
| 6,244,044 B1 * | 6/2001 | Bartley | B01D 53/944 60/274 |
| 6,261,345 B1 | 7/2001 | Miyano et al. | |
| 2003/0089026 A1 * | 5/2003 | Jordan | C10L 1/00 44/307 |
| 2007/0277507 A1 * | 12/2007 | Yan | B01D 53/9418 60/286 |
| 2010/0107605 A1 * | 5/2010 | Brinkman | B01D 53/9418 60/274 |
| 2013/0149225 A1 * | 6/2013 | Schwefer | B01D 53/8628 423/239.2 |

FOREIGN PATENT DOCUMENTS

| | | | |
|---|---|---|---|
| EP | 1350552 | A2 | 10/2003 |
| EP | 2505581 | * | 3/2011 |
| KR | 20100008956 | * | 1/2010 |
| WO | 03105998 | A1 | 12/2003 |
| WO | 2009050323 | A1 | 4/2009 |
| WO | 2010046675 | A1 | 4/2010 |
| WO | 2010105778 | A1 | 9/2010 |
| WO | 2013087181 | A2 | 6/2013 |
| WO | 2014106533 | A1 | 7/2014 |

* cited by examiner

ELIMINATION OF AMMONIA AND LOWER ALKANES AND/OR HYDROGEN FROM WASTE GAS STREAMS IN INDUSTRIAL PLANTS

CROSS-REFERENCE TO RELATED APPLICATIONS

This application is the national phase of, and claims priority to, International Patent Application No. PCT/EP2013/003900, filed Dec. 20, 2013, which claims priority to German Patent Application No. DE 102013000013.0, filed Jan. 2, 2013. These applications are each incorporated by reference herein in their entireties.

BACKGROUND

1. Field of the Invention

The invention relates to a process for the joint removal of ammonia and lower alkanes and/or hydrogen from offgas streams in an industrial plant by combined oxidation and reduction. Here, the content of the lower alkanes and/or hydrogen in the same or a further offgas stream of the industrial plant should be partly utilized as reducing agent for the nitrogen oxides liberated in the oxidation of ammonia, with the concentration of both the ammonia and the lower alkanes being decreased. In this novel process, the pollutants which are in any case present in the process offgases thus serve as reaction partners for efficient removal of one another. This reduces the outlay compared to separate purification of the respective offgas streams.

2. Description of the Related Art

In some industries, e.g. in the production of fertilizers, offgas streams contaminated with ammonia or with lower alkanes, for example methane, are obtained in various sections of the process. Owing to the environmental and odor pollution brought about by such compounds, these offgas streams have to be purified before release into the ambient air. These offgas streams are, for example, the offgas streams from the low-pressure absorber or the atmospheric absorber in a urea synthesis plant. Such offgas streams are problematic since their emission values of the pollutants present therein are far above the recommended concentrations proposed in the technical guidelines for clean air. See First general administrative regulations relating to the German federal environmental protection law, 2002. Here, for example, a value of 50 mg/standard m$^3$ is required for ammonia emissions.

Many processes for the separate purification of ammonia- or alkane-containing streams are now prior art and are presented below. The term nitrogen oxide used here is a conventional collective term for the gaseous oxides of nitrogen, e.g. nitrogen monoxide NO, nitrogen dioxide $NO_2$ (together referred to as $NO_x$) or dinitrogen monoxide $N_2O$ (nitrous oxide).

The removal of ammonia from exhaust air is achieved by addition of sulfuric acid or nitric acid in the processes known in the patent literature. This process is also known under the name "acid scrub", as described, for example, in U.S. Pat. No. 3,607,022. The ammonia is in this case removed from the exhaust air stream by chemical absorption, with ammonia being converted into the corresponding ammonium salt in the acidic solvent. Thus, the use of nitric acid leads to formation of ammonium nitrate, while ammonium sulfate is formed when sulfuric acid is used. These solutions containing ammonium salt then form wastewater streams which cannot simply be released into the wastewater system. A solution to the disposal of the salt solution produced thus has to be found. In addition, the acid scrub requires a large outlay in terms of apparatus and logistics since, apart from the complex scrubber, appropriate amounts of acid also have to be purchased and stored.

Furthermore, the prior art for the disposal of ammonia-containing offgas streams includes combustion in flares. However, significant amounts of auxiliary gas are required to ensure a minimum calorific value, depending on the concentration of ammonia and other combustible impurities. The combustion of ammonia taking place in an uncontrolled manner in the flare also leads to formation of significant amounts of nitrogen oxides which likewise represent environmental pollutants and whose formation should thus be avoided. In addition, open flares are considered to be problematic for continuous operation by the authorities in Europe because of the lack of possible emission measurements. On the other hand, the operation of an alternative, closed flare which allows controlled combustion with subsequent emission measurement is associated with a higher outlay in terms of apparatus.

A further process mentioned in the patent literature for purifying ammonia-containing offgas streams is selective oxidation of ammonia to form nitrogen, which is carried out with the aid of specific catalysts and is described, for example, in DE 695 30 024 T2 and EP 0 514 729 B1. This oxidation leads to evolution of heat which in the case of uncooled reactors leads to an increase in the reactor temperature. However, the selectivity of this process decreases at increased temperatures, i.e. the proportion of nitrogen oxides formed increases. Thus, this process is usually used for streams which are contaminated with small amounts of ammonia and lower alkanes and/or hydrogen.

EP 1 350 552 B1 discloses a process for the treatment of ammonia-containing streams with the aid of the SCR (selective catalytic reduction) technology. In a first step, the combustion of the ammonia takes place in a thermal after-incineration plant, with nitrogen oxides inevitably being formed. The invention then makes use of the fact that the combustion of ammonia does not proceed completely and provides for the unburnt ammonia to be utilized in a further step in order to destroy the nitrogen oxides by means of selective catalytic reduction. Complicated regulation has to be expected in this process since the degree of combustion has to be matched to the amount of nitrogen oxides formed.

A further alternative for the removal of ammonia from offgases is adsorption, e.g. on activated carbon or zeolites, as disclosed in U.S. Pat. No. 6,261,345 B1. A disadvantage of this process is its non-steady-state operation consisting of adsorption and desorption phases, which increases the outlay both in terms of apparatus and for operation.

The physical absorption of ammonia using solvents such as water or glycols is likewise prior art, as evidenced by U.S. Pat. No. 5,230,877. However, the purities of the offgas which can be achieved here are greatly dependent on the operating conditions of the scrub, e.g. temperature and pressure. High pressure and low temperature are advantageous, but these result in additional capital and operating costs. Absorption in water is used, for example, for the gas mixture consisting of ammonia, methane and nitrogen obtained as purge or flash gas in the synthesis of ammonia. Here, in particular, the high admission pressure of the gases (about 200 bar) is advantageous for physical absorption.

The lower alkanes which likewise occur in offgases belong to the group of volatile hydrocarbons. Particular mention may be made of methane which is a strong greenhouse gas which is up to 20 to 30 times more damaging than carbon dioxide.

A simple method of purifying the alkane- and/or hydrogen-containing offgas streams is thermal utilization. However, when proportions of ammonia are present, the problems of nitrogen oxide emission due to incomplete or unselective combustion have to be taken into account again. In addition, if calorific values of the offgases are too low, additional fuel such as natural gas has to be consumed in order to ensure stable combustion.

A reduction in the fuel required for oxidation of organic constituents can be achieved by the use of regenerative catalytic after-combustion. Here, a reduction in the combustion temperature required is achieved by the presence of a suitable noble metal catalyst. Furthermore, the heat evolved as a result of combustion is utilized to preheat the untreated crude gas via a plurality of reactor beds which can be connected differently. Owing to the non-steady-state operation of the individual reactors with heating and cooling phases, complex connection and regulation of a plurality of reactors is necessary for industrial use, which makes the use of this process costly.

The purification of an offgas stream which is contaminated both with ammonia and with lower alkanes is possible only with difficulty according to the available prior art. This is because, according to the available prior art, various purification steps have to be combined in a sequence in order to meet the required limit values, especially for the nitrogen oxides, in the offgas.

SUMMARY

Disclosed herein is an economical process which may allow for the joint removal both of ammonia and of lower alkanes in a simple way, so that the legally prescribed emission limits of the pollutants are adhered to. The novel process should be able to be integrated into existing industrial plants.

DETAILED DESCRIPTION

Figure 1:
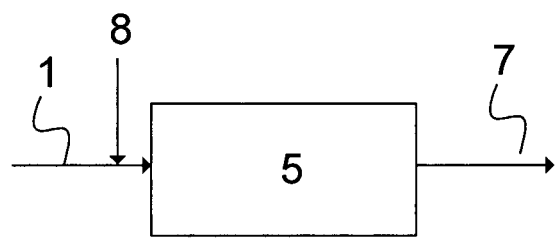
FIG. 1 illustrates a schematic process diagram of the oxidation-reduction process according to one embodiment of the invention.

In one embodiment of the invention, a process for the joint removal both of ammonia and of lower alkanes and/or hydrogen which are present in one or more offgas streams in an industrial plant is disclosed. The process includes combined oxidation and reduction by the reduction-oxidation process, where the ammonia and the lower alkanes and/or hydrogen are converted completely or partly into nitrogen, carbon dioxide and water by chemical reaction. The offgas stream containing ammonia and the lower alkanes and/or hydrogen is passed over one or more catalysts for combined oxidation and reduction and the oxygen content in the offgas stream is set so that ammonia and the lower alkanes and/or hydrogen are firstly oxidized in an oxidation zone to form nitrogen, carbon dioxide and water and the nitrogen oxides formed are subsequently reduced in a reduction zone to form elemental nitrogen.

The formation of this oxidation and reduction zone may be brought about by targeted setting of the ratio of the sum of the oxidizable components, i.e., for example, of $NH_3$ and/or $H_2$, and oxygen. In this context, a combustion air ratio, which is the ratio of the amount of oxygen actually available in the mixture of the offgas streams to be treated to the stoichiometric amount of oxygen which is at least necessary for complete combustion (oxidation) of the fuels present (i.e. oxidizable components) is defined.

According to one embodiment of the invention, the combustion air ratio is 0.7-1.3, preferably 0.8-1.2, and particularly preferably 0.9-1.1. The setting of the combustion air ratio according to the invention ensures that sufficient oxygen is present in the oxidation zone while the oxygen concentration advantageously remains low in the reduction zone.

The oxygen required for the oxidation is advantageously at least partly present in one or more of the offgas streams to be purified. In the case of a combustion air ratio of less than 1.0, the oxygen required for the oxidation can, according to the invention, be injected as pure substance or in the form of air into one or more of the offgas streams to be purified. In the case of a combustion air ratio of greater than 1.0, the setting of the combustion air ratio according to the invention can be effected by addition of alkanes such as methane and/or hydrogen required for the reduction to one or more of the offgas streams to be purified.

The measurement and setting of the desired combustion air ratio can be carried out on the basis of periodic sample analyses or with the aid of continuous measurements upstream and downstream of the process step comprising the oxidation and reduction zone. This can occur, for example, by means of a lambda sensor as is also used in the exhaust gas stream from a spark-ignition engine. Regulation of the combustion air ratio is also possible if necessary.

The reaction schemes shown below describe the chemical reactions occurring in the oxidation and reduction zone. These are by way of example and represent only part of the possible oxidation and reduction reactions.

Oxidation zone: the oxidation of the combustible or oxidizable offgas components takes place here in the presence of oxygen. Ammonia ($NH_3$), the lower alkanes and hydrogen (H$_2$) are partly and/or completely oxidized predominantly according to the following net equations. In the equations, the index n indicates the number of carbon atoms in the alkane C$_n$H$_{2n+2}$ and the index x indicates the number of oxygen atoms in the nitrogen oxide NO$_x$:

$$2H_2 + O_2 \rightarrow 2H_2O \quad (1)$$

$$C_nH_{2n+2} + (2n+1)O_2 \rightarrow nCO_2 + (n+1)H_2O \quad (2)$$

$$4NH_3 + 3O_2 \rightarrow 2N_2 + 6H_2O \quad (3)$$

$$2C_nH_{2n+2} + nO_2 \rightarrow 2nCO + 2(n+1)H_2 \quad (4)$$

$$2CO + O_2 \rightarrow 2CO_2 \quad (5)$$

$$4NH_3 + 4O_2 \rightarrow 4N_2O + 6H_2O \quad (6)$$

$$4NH_3 + (3+2x)O_2 \rightarrow 4NO_x + 6H_2O \quad (7)$$

Reduction zone: the oxygen present is entirely or partly consumed by the oxidation and the oxygen concentration decreases. In the now low-oxygen mixture, the reactions necessary for the reduction of nitrogen oxide can now proceed. The nitrogen oxides formed in the oxidation of ammonia and any nitrogen oxides previously present in the offgas are reduced to elemental nitrogen N$_2$. Any as yet unreacted ammonia and also the lower alkanes and/or hydrogen which have not yet been oxidized or been only partly oxidized in this stream or a further offgas stream are utilized as reducing agents:

$$2C_nH_{n+2} + (6n+2)NO \rightarrow 2nCO_2 + (2n+2)H_2O + (3n+1)N_2 \quad (8)$$

$$2xH_2 + 2NO_x \rightarrow 2xH_2O + N_2 \quad (9)$$

$$2xCO + 2NO_x \rightarrow N_2 + 2xCo_2 \quad (10)$$

$$CO + NO_2 \rightarrow NO + CO_2 \quad (11)$$

$$6NO_x + 4xNH_3 \rightarrow (2x+3)N_2 + 6xH_2O \quad (12)$$

$$4NH_3 + 4NO + O_2 \rightarrow 4N_3 + 6H_2O \quad (13)$$

$$2NH_3 + NO + NO_2 \rightarrow 2N_2 + 3H_2O \quad (14)$$

In a practical embodiment of the invention, the abovementioned reactions are accelerated by a heterogeneous catalyst, resulting in a fluid transition between oxidation zone and reduction zone in the catalyst bed. The conversion of the oxidation reactions (1)-(7) is greatest in the region of high oxygen concentration. However, as the oxygen concentration drops, this decreases and the conversion of the reactions for the reduction of nitrogen oxide (8)-(14) increases. Oxidation and reduction thus take place jointly in one process step, which will hereinafter be referred to as oxidation-reduction process, according to the invention.

The targeted selection of the catalyst enables individual reactions to proceed preferentially selectively. The choice of suitable catalysts which are known in principle to those skilled in the art is described below.

Owing to the simple process principle sought, the catalyst to be used should be selected so that it oxidizes ammonia, lower alkanes and hydrogen in the presence of oxygen while reduction of the nitrogen oxides occurs when there is an oxygen deficiency.

Suitable catalysts for the oxidation-reduction process have to assist both the oxidation and the reduction and are known to a person skilled in the art for other uses and pollutants (e.g. three-way catalyst in a motor car). Preference is given to selecting one or more catalysts containing elements from the group of noble metals, with preference being given to using palladium, platinum or rhodium and mixtures of these compounds. The catalysts can additionally contain additives known to those skilled in the art, e.g. binders and/or promoters.

The catalyst can be configured as all-active catalyst or supported catalyst based on SiO$_2$, aluminosilicate, Al$_2$O$_3$ or other refractory oxides. The catalyst can be present as shaped body of any size and geometry, preferably in geometries which have a large ratio of surface area to volume and in the case of which a very low pressure drop is produced when flow occurs through them. Typical geometries are all geometries known in catalysis, e.g. cylinders, hollow cylinders, multihole cylinders, rings, crushed granular material, trilobes or honeycomb structures.

One or more of the abovementioned catalysts is/are arranged in a reaction vessel (reactor) into which the offgas stream to be purified is introduced. The reactor, the internals and the catalyst are selected so that the offgas stream flows through the catalyst and the abovementioned oxidation and reduction reactions occur on the way. The offgas which has been completely or partially freed of the pollutants is subsequently discharged from the reactor. Any addition of alkanes and/or hydrogen and of air or oxygen to the offgas stream which may be necessary can be effected into the feed line to the reactor and/or directly in the reactor. A measurement of the gas composition (e.g. continuously by means of a lambda sensor) is preferably carried out in the offgas line immediately before the reactor or within the reactor before the gas stream enters the catalytic region. A further, second measurement after exit of the gas from the catalytic region is advantageous since the function of the catalyst can be monitored by means of this additional measurement.

The offgas to be purified in the oxidation-reduction process is usually passed over the catalyst at a space velocity of from 2000 to 200 000 h$^{-1}$, preferably from 3000 to 100 000 h$^{-1}$, in particular from 5000 to 50 000 h$^{-1}$. The space velocity is defined as the ratio of the volume of gas mixture (measured at 0° C. and 1.014 bara) per hour to volume of catalyst. The space velocity can thus be set via the volume flow of the gas and/or via the amount of catalyst.

In the oxidation-reduction process, the temperature is usually in the range from 200° C. to 800° C., preferably from 250° C. to 750° C. and particularly preferably from 300° C. to 700° C.

In a further embodiment of the invention, the oxidation-reduction process is followed by a selective catalytic reduction in order to decrease the concentration of the nitrogen oxides which have been formed.

A reducing agent such as ammonia is required for the selective catalytic reduction to proceed. It is particularly advantageous to feed a substream of the ammonia-containing offgas stream to be treated directly to the selective catalytic reduction in order to reduce nitrogen oxides. In a further embodiment, a reducing agent selected from the group consisting of ammonia, aqueous ammonia and urea solution is additionally injected into the offgas stream which contains nitrogen oxide and undergoes the selective catalytic reduction.

When the oxygen concentration at the exit from the reduction-oxidation process is too low, the oxygen required for the selective catalytic reduction can be introduced in the form of air or pure oxygen into the offgas stream which contains nitrogen oxide and undergoes the selective catalytic reduction.

The required amount of reducing agent and/or air/oxygen can be determined by means of analyses of samples or else using continuous measurements upstream and downstream of the selective catalytic reduction. This can be effected, for example, by means of an $NO_x$ sensor as is also used in the exhaust gas stream from a spark-ignition engine. Regulation of the addition of reducing agent and/or air/oxygen is also possible if necessary.

Many usable catalysts (known as $DeNO_x$ catalysts) are known to those skilled in the art. Preference is given to classical catalysts, in particular those containing transition metals and/or transition metal oxides such as iron, nickel, copper, cobalt, manganese, rhodium, rhenium or vanadium oxides or metallic platinum, gold or palladium and also mixtures of these compounds. Particular preference is given to catalysts based on $V_2O_5$—$TiO_2$. Preference is also given to using zeolite catalysts loaded with transition metals; particular preference is given to zeolites of the MFI, for example ZSM-5, or BEA type. The catalysts usually contain further additives known to those skilled in the art, e.g. binders.

The $DeNO_x$ catalysts used can be configured as all-active catalyst or supported catalyst. The possible configurations are analogous to the forms which have been indicated above for the oxidation-reduction catalyst.

The space velocities to be employed in the selective catalytic reduction are typically from 2000 to 200 000 $h^{-1}$, preferably from 3000 to 100 000 $h^{-1}$, in particular from 5000 to 50 000 $h^{-1}$.

In the selective catalytic reduction, the temperature is usually in the range from 150° C. to 600° C., preferably from 250° C. to 550° C., particularly preferably from 300° C. to 500° C.

In a further embodiment of the invention, a selective catalytic oxidation of ammonia to elemental nitrogen is carried out upstream of the oxidation-reduction process. This reduces the ammonia burden for the subsequent oxidation zone of the oxidation-reduction process and thereby reduces the formation of nitrogen oxide there. The subsequent reduction zone can therefore be made smaller and/or a final selective reduction can be omitted.

The usable catalysts are likewise known to those skilled in the art. Preference is given to classical oxidation catalysts, in particular those containing transition metals and/or transition metal oxides such as iron, nickel, copper, chromium, cobalt, manganese, rhodium oxides or metallic platinum, silver or palladium and also mixtures of these compounds. Particular preference is given to catalysts based on $SiO_2$, aluminosilicate or $Al_2O_3$. Preference is also given to using zeolite catalysts loaded with transition metals; particular preference is given to a zeolite of the MFI, for example ZSM-5, or BEA type. The catalysts usually contain further additives such as binders.

The catalysts used for the selective oxidation can be configured as all-active catalyst or supported catalyst. The possible configurations are analogous to the forms indicated above for the oxidation-reduction catalyst.

The space velocities to be employed in the selective oxidation are usually in the range from 2000 to 200 000 $h^{-1}$, preferably from 3000 to 100 000 $h^{-1}$, in particular from 5000 to 50 000 $h^{-1}$.

The temperature in the selective oxidation is usually in the range from 200° C. to 450° C., preferably from 250° C. to 400° C., particularly preferably from 250° C. to 350° C.

All the abovementioned process steps of selective oxidation, oxidation-reduction and selective catalytic reduction can optionally be combined with one another.

The process claimed is advantageous for offgases having an ammonia content of from 30 to 50 000 mg/standard $m^3$ and a content of lower alkanes of from 0.1 to 10% by weight.

The process claimed is optionally employed for the joint removal of ammonia and lower alkanes in fertilizer plants. The plant is advantageously a urea synthesis plant. In an advantageous embodiment of the invention, the offgas stream to be treated originates from a low-pressure absorber and/or an atmospheric absorber of this urea synthesis plant.

The oxidation-reduction process presented and also its switching arrangement presented can, according to the invention, be realized in one apparatus the fundamental structure of which has already been disclosed in EP 2 286 897 B1 for another purpose, viz. the removal of nitrogen oxides from gas streams. While EP 2 286 897 B1 is restricted to the use of two catalyst beds, a plurality of catalyst beds can be used in the present application, depending on the process steps used.

The present invention therefore also provides the following apparatus for the joint removal both of ammonia and of lower alkanes and/or hydrogen which are present in one or more offgas streams in an industrial plant, which comprises:
A) a reactor containing at least one catalyst bed containing one or more catalysts through which offgas to be purified flows,
B) an apparatus for introducing the reducing agent and/or oxidant into the offgas stream, and
C) a mixer in which the offgas stream is mixed with the reducing agent and/or oxidant.

In a preferred embodiment of the apparatus which can be used in the process of the invention, a plurality of catalyst beds are arranged in one vessel, which significantly reduces the apparatus costs.

The catalyst bed is arranged so that offgas flows through it laterally or axially.

The catalyst beds through which lateral flow occurs are, for example, configured in the form of hollow cylinders but can also have other shapes. The catalyst beds through which lateral flow occurs can be arranged above one another or a combination of catalyst beds through which axial and lateral flow occurs can be selected. Here, the path of the gas is prescribed by suitably installed separation surfaces between the catalyst beds in such a way that flow occurs in the correct order through the catalyst beds.

In a particularly preferred embodiment, at least one of the catalyst beds is configured as hollow bodies, particularly preferably as hollow cylinders, through which the gas to be purified flows laterally.

The flow direction of the gas through the catalyst bed can, in the case of lateral flow, occur from the inside outward or from the outside inward.

In a preferred embodiment, two or three catalyst beds through which radial flow occurs, for example in the form of two or three hollow cylinders, having different dimensions are present and the external and internal dimensions of the catalyst beds are selected in such a way that two or three catalyst beds can be arranged concentrically and the path of the offgas is prescribed by suitably installed separation surfaces between the catalyst beds in such a way that the flow occurs in the correct order through the catalyst beds.

In the apparatus of the invention, the offgas is, after addition of oxidant, reducing agent or air/oxygen, introduced into a mixer which is preferably arranged in the center of the apparatus.

The mixer serves to distribute the reducing agent intimately in the offgas stream. The mixer can be configured freely, for example as static mixer having appropriate internals or as dynamic mixer. The simplest form of a tube through which flow is preferably turbulent can also be considered to be a mixer for the purposes of the invention.

The present invention is illustrated below with the aid of the figures. The oxidation-reduction process step proposed in the present invention is shown in FIG. 1.

In FIG. 1, an untreated offgas stream 1 which contains both ammonia and lower alkanes and/or hydrogen and originates, for example, from a low-pressure absorber and/or an atmospheric absorber of a urea synthesis plant is introduced into an appropriate apparatus 5 for decreasing the concentration of the alkanes present and of the ammonia. The apparatus 5 is equipped with the catalyst material necessary for the oxidation-reduction process. Small traces of hydrogen in the offgas are advantageous for start-up and stable operation since this element can be oxidized even at low temperatures. If the combustion air ratio of the offgas or the offgas mixture differs too greatly from the desired range from 0.9 to 1.1, additional air or oxygen or reducing agent such as alkanes can be introduced into the process via the stream 8. The reactions of ammonia and the lower alkanes occur at temperatures up to 750° C. and a stream 7 composed of nitrogen, carbon dioxide and water is formed. The amount of oxidizable material in the offgas streams proposed here is usually sufficient for no additional energy to have to be introduced into the process to maintain the temperature conditions. If the gas entry temperature for the oxidation-reduction process is not sufficiently high, the waste heat of the offgas can be utilized for heating the untreated gas stream by means of a heat exchanger. In order to reduce the temperature within the oxidation-reduction process if necessary, the introduction of chemically inert components such as carbon dioxide or water/steam into the offgas stream or directly into the oxidation-reduction process is provided for. For this purpose, it is possible for the apparatus 5 to have a number of stages. Apart from the addition of inerts, the use of heat exchangers for maintaining temperature conditions is also possible. The latter can also be used for heating if the heat of reaction liberated is not sufficient for autothermal operation of the oxidation-reduction process.

The offgas stream 7 in FIG. 1 ideally no longer contains any nitrogen oxides. However, since the concentration of these in the offgas of the oxidation-reduction process is greatly dependent on the original impurities, the temperature conditions in the reactor and the catalyst used, various process modifications which make a further targeted reduction of the nitrogen oxides possible are indicated below.

In a further embodiment of the invention (FIG. 2), the oxidation-reduction process is extended by a downstream, selective catalytic reduction stage 6 in order to reduce the concentration of the nitrogen oxides in the offgas stream 2 leaving the oxidation-reduction process.

The reducing agent required for the selective catalytic reduction (ammonia or urea solution) is introduced as stream 9 into the partially treated offgas stream 2. In the apparatus for the selective catalytic reduction, the nitrogen oxides present in the offgas 2 are then catalytically decomposed in a temperature range from 150 to 550° C., essentially according to the net reaction below:

$$4NO+4NH_3+O_2 \rightarrow 4N_2+6H_2O \qquad (15)$$

The purified offgas 7 which results is virtually free of nitrogen oxides, ammonia, methane and hydrogen and is discharged into the environment.

The selective catalytic reduction requires a certain concentration of oxygen in the offgas stream. However, the advantageously low oxygen concentration within the preceding reduction zone stands in the way of this. If the operating conditions of the two process steps cannot be reconciled in respect of the oxygen concentration, the missing amount of oxygen can be introduced as stream 12 in the form of air or pure oxygen into the selective catalytic reduction.

Figure 2:
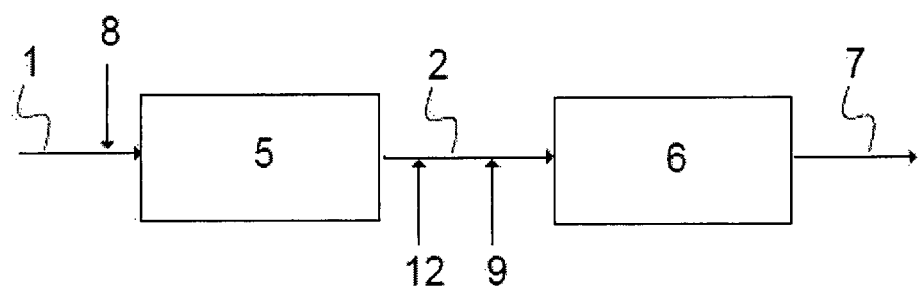
FIG. 2 illustrates a schematic process diagram of the oxidation-reduction process with downstream selective catalytic reduction according to another embodiment of the invention.

In contrast to a conventional, catalytic combustion which can be likewise used in this context, the oxidation-reduction stage in the process configuration as per FIG. 2 has the advantage that the nitrogen oxide emissions from the partially treated stream 2 are lower, which allows the selective catalytic reduction to be made smaller and allows savings in terms of the operating materials (reducing agent).

Figure 3:
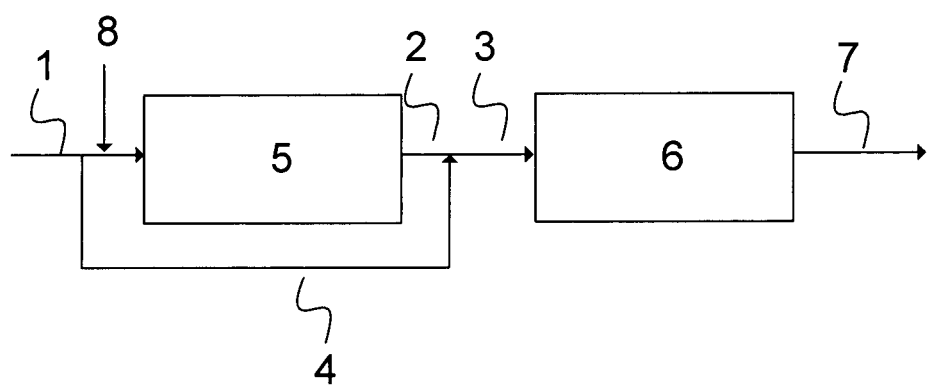
FIG. 3 illustrates a schematic process diagram of the oxidation-reduction process with offgas bypass and downstream selective catalytic reduction according to still another embodiment of the invention.

A further saving of reducing agent is possible if, as shown in FIG. 3, a substream 4 of the untreated offgas stream 1 is mixed with the treated stream 2 from the oxidation-reduction process. The ammonia present in the original offgas then serves as reducing agent for the selective catalytic reduction 6 in the mixed stream 3. If substream 4 also comprises sufficient oxygen for the selective catalytic reduction, separate introduction of oxygen can be dispensed with in this variant.

Figure 4:
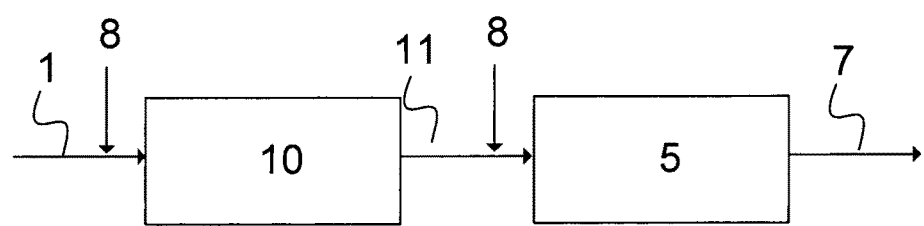
FIG. 4 illustrates a schematic process diagram of the oxidation-reduction process with upstream selective oxidation according to still yet another embodiment of the invention.

In a further embodiment of the invention (FIG. 4), a process step for the selective oxidation of ammonia is present upstream of the oxidation-reduction process.

In the apparatus for selective oxidation 10, ammonia is converted with high selectivity according to equation (3) into elemental nitrogen. When the reaction temperature is selected appropriately, the formation of nitrogen oxides can be virtually completely suppressed. The temperature can be kept low since the likewise energy-liberating oxidation of the lower alkanes commences only at higher temperatures. Thus, only the heat liberated by the oxidation of ammonia has to be taken into account in maintaining the temperature conditions. Subsequently, the stream 8 consisting of air or oxygen and/or reducing agent is mixed into the pretreated stream 11. This mixture is then treated further as described above in the apparatus for the oxidation-reduction process 5. The advantage of this combined configuration is that the apparatus for selective oxidation 10 does not have to ensure complete conversion of ammonia. The impurities remaining in the stream 11, e.g. unreacted ammonia, any nitrogen oxides formed and alkanes and/or hydrogen, are decomposed by the oxidation-reduction stage 5. The advantage of the upstream selective oxidation for the oxidation-reduction process is that the decomposition of the major part of the ammonia enables the oxidation-reduction stage to be operated at higher temperatures and any cooling power necessary can be reduced. This would not be possible without the combination with the selective oxidation since the oxidation-reduction process sometimes causes unsatisfactory nitrogen oxide emissions at relatively high temperatures and a high ammonia loading in the offgas. The additional oxygen which may possibly be required for the oxidation can be introduced into the process in the stream 8 before and/or after the selective reduction.

Figure 5:
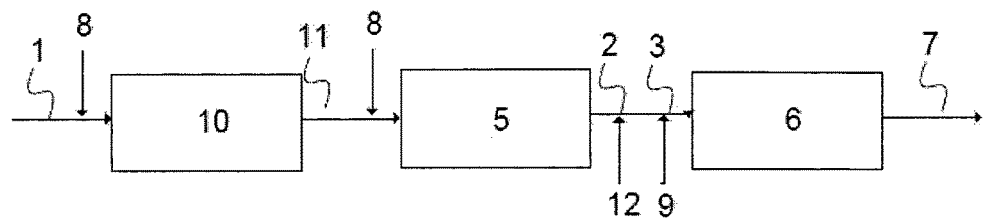
FIG. 5 illustrates a schematic process diagram of the oxidation-reduction process with upstream selective oxidation and downstream selective catalytic reduction according to yet another embodiment of the invention.

All process variants shown (FIGS. 1-4) can be combined with one another and be integrated into one or more apparatuses. A combined process consisting of a selective oxidation, the oxidation-reduction stage and the subsequent selective reduction is depicted in FIG. 5.

FIGS. 6 to 11 describe preferred embodiments of the apparatus of the invention in longitudinal section by way of example for the use of two catalyst beds. Applications for two catalyst beds would, according to the invention, be the combination of the oxidation-reduction process with preceding selective oxidation or the variant with downstream selective catalytic reduction.

Figure 6:
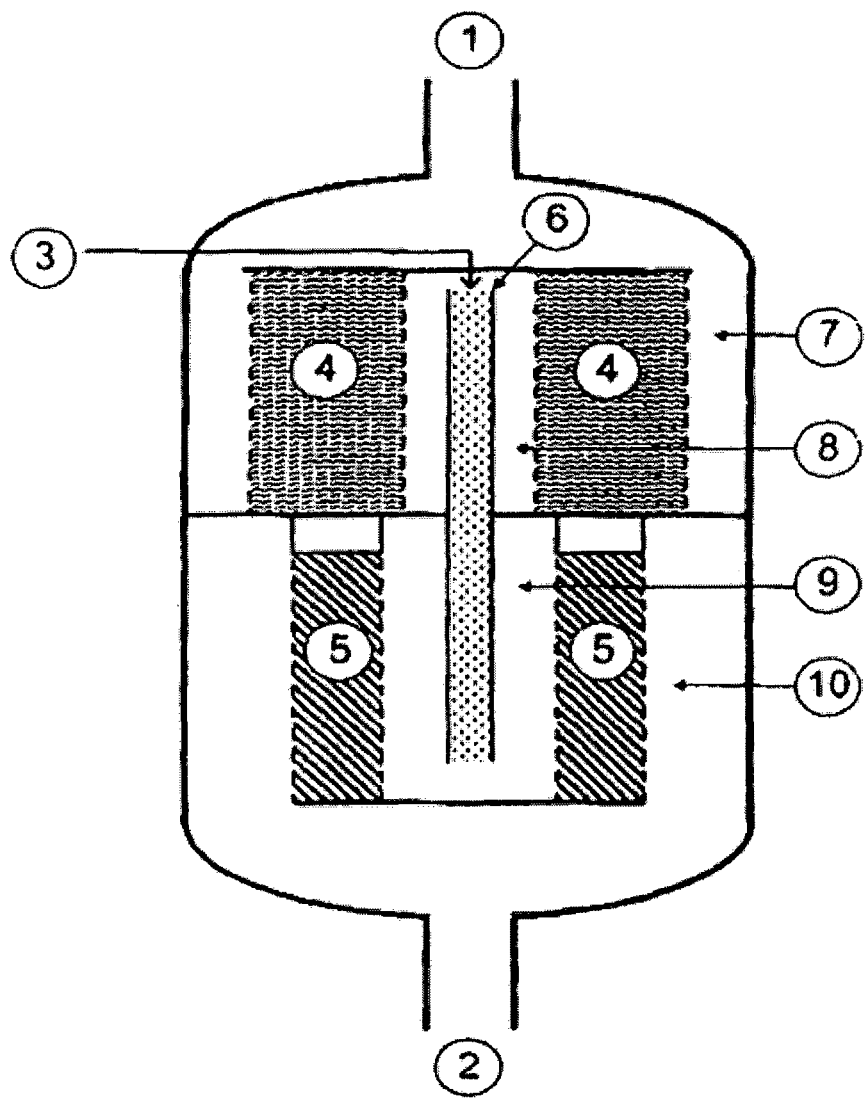
FIG. 6 illustrates a schematic depiction of a reactor according to one embodiment of the invention.

FIG. 6 shows an apparatus according to the invention with gas inlet (1) and gas outlet (2). In the upper interior space facing the gas inlet (1), the first catalyst bed is arranged in the form of a hollow cylinder (4) and is located on a dividing wall which divides the space within the apparatus into two halves. Furthermore, the upper side face of the hollow cylinder (4) is closed by a dividing wall. The offgas to be purified flows through the gas inlet (1) and via the annular gap of the entry (7) of the first catalyst bed radially through the first catalyst bed into the annular gap of the exit (8) of the first catalyst bed. From there, it flows into the mixer (6) at the entry end of which an inlet line (3) for the necessary additives (reducing agent, oxidant) opens. The mixer (6) is passed through the dividing wall and the offgas then flows through the annular gap of the entry (9) of the second catalyst bed (5) arranged under the first catalyst bed (4) introduced radially through the second catalyst bed into the annular gap of the exit (10) of the second catalyst bed (5). From there, the purified offgas leaves the apparatus through the gas outlet (2).

Figure 7:
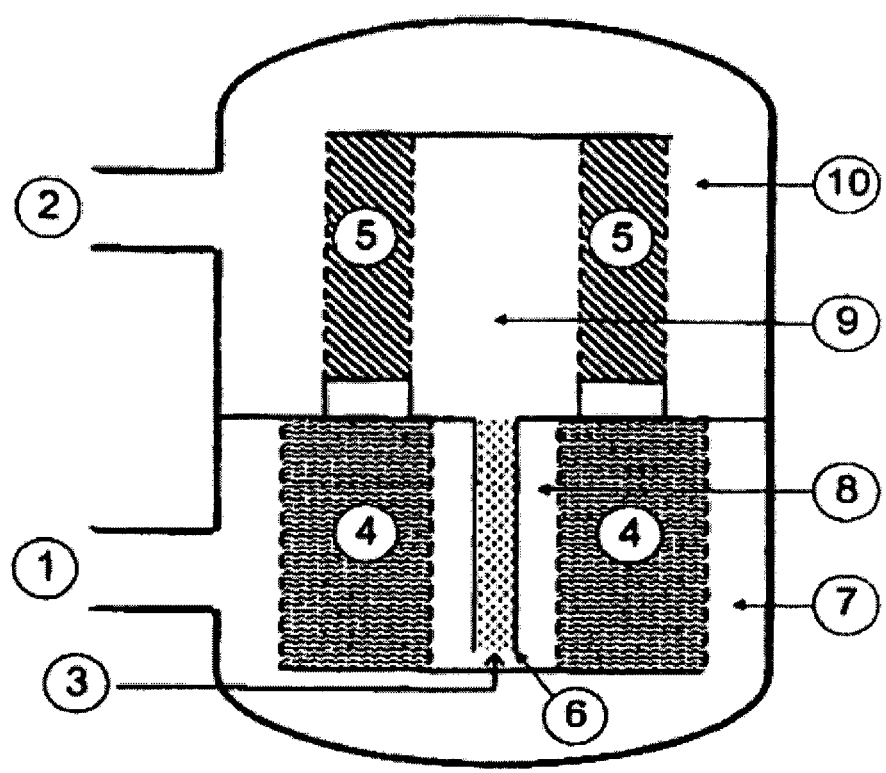
FIG. 7 illustrates a schematic depiction of a reactor according to another embodiment of the invention.

FIG. 7 describes a similar configuration as shown in FIG. 1 with the modification that the first catalyst bed (4) is arranged underneath the second catalyst bed (5) and that the gas inlet (1) and gas outlet (2) are arranged laterally in the apparatus. The other reference numerals have the meaning indicated in the description of FIG. 1.

Figure 8:
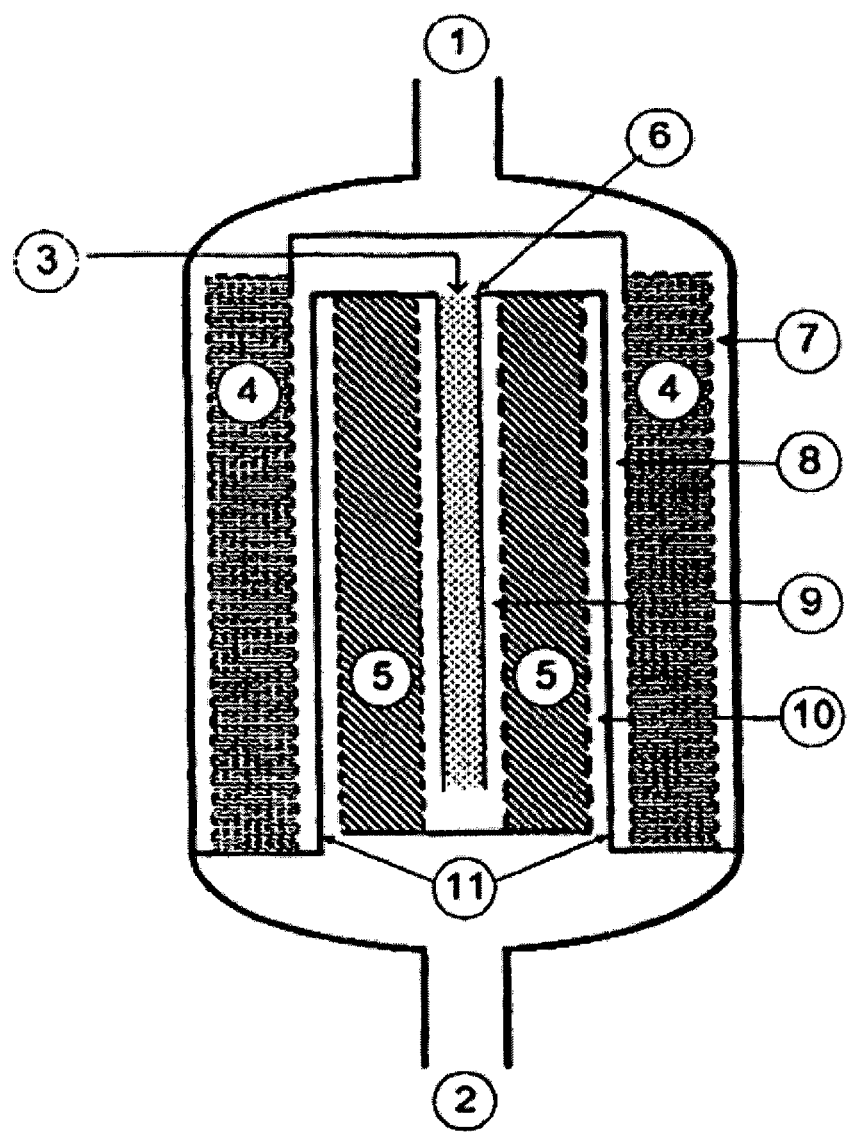
FIG. 8 illustrates a schematic depiction of a reactor according to another embodiment of the invention.

FIG. 8 shows a further embodiment of the apparatus of the invention with gas inlet (1) and gas outlet (2). The first catalyst bed (4) and the second catalyst bed (5) are in this case configured in the form of two hollow cylinders arranged concentrically within one another. The first catalyst bed (4) is present outside a concentric dividing wall (11) which closes off the lower side face of the catalyst bed (4), the annular gaps (7) and (8) and also the interior space of the apparatus and the upper side face of the second catalyst bed (5). The offgas to be purified enters the apparatus through the gas inlet (1), flows through the first catalyst bed from the annular gap entry (7) radially from the outside inward into the annular gap exit (8). From there, it flows into the mixer (6) at the entry end of which an inlet line (3) for the necessary additives (reducing agent, oxidant) opens. The mixer (6) opens into the interior space of the second catalyst bed (5) which is closed in a downward direction by a dividing wall. The offgas then flows through the annular gap of the entry (9) of the second catalyst bed (5) radially outward through the second catalyst bed into the annular gap of the exit (10) of the second catalyst bed (5). From there, the purified gas leaves the apparatus through the gas outlet (2).

Figure 9:
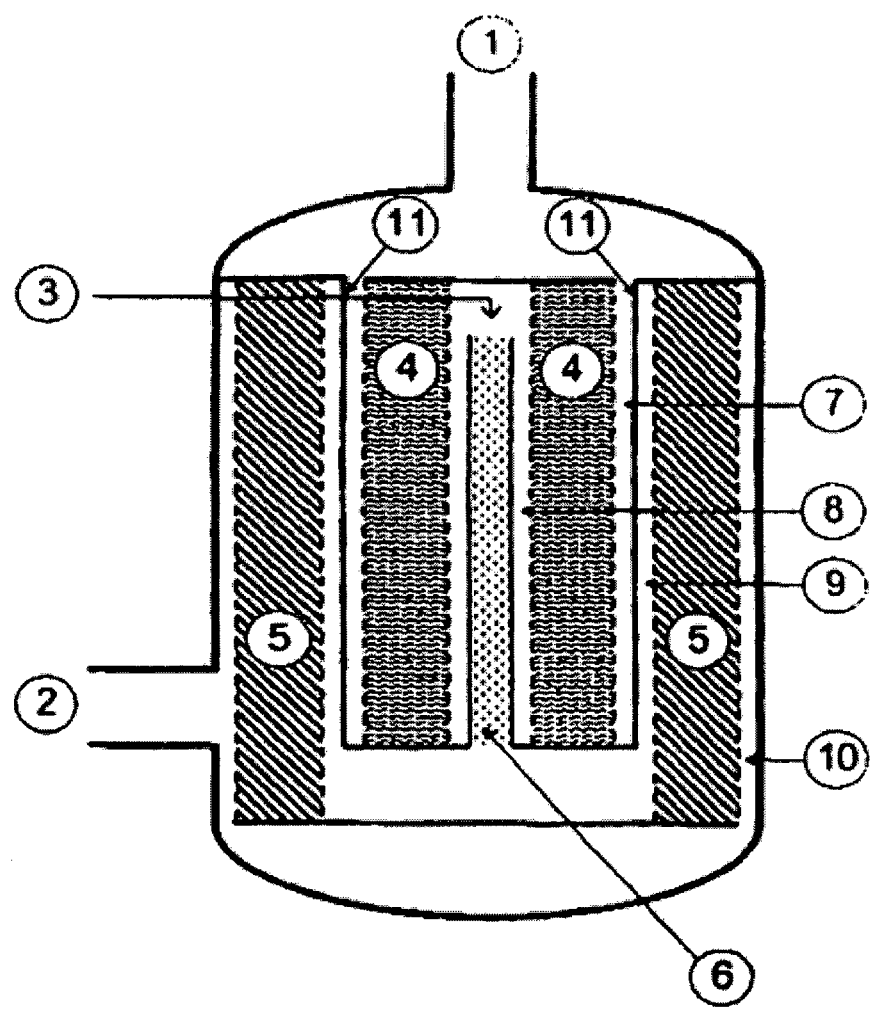
FIG. 9 illustrates a schematic depiction of a reactor according to yet another embodiment of the invention.

FIG. 9 describes a similar configuration to that shown in FIG. 8 with the modification that the first catalyst bed (4) forms the inner hollow cylinder and the second catalyst bed (5) forms the outer hollow cylinder. The other reference numerals have the meaning indicated in the description of FIG. 8.

Figure 10:
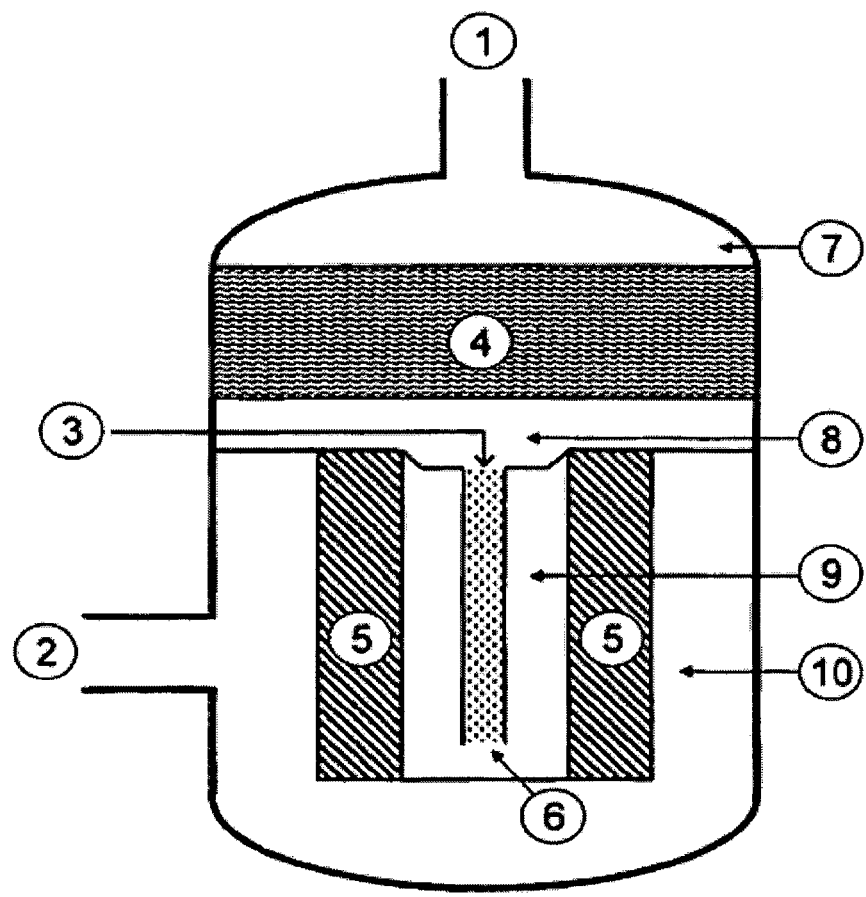
FIG. 10 illustrates a schematic depiction of a reactor according to still yet another embodiment of the invention.

FIG. 10 describes a configuration in which a catalyst bed through which axial flow occurs and a catalyst bed through which radial flow occurs are provided. The offgas flows via the gas inlet (1) axially through the first catalyst bed (4) and into the mixer (6). In the apparatus, there is a dividing wall which divides the space of the apparatus into two halves. At the entry end of the mixer (6), an inlet line (3) for the necessary additives (reducing agent, oxidant) opens. From the mixer (6), the gas flows into the annular gap of the entry (9) of the second catalyst bed (5) and through this radially into the annular gap of the exit (10). From there, the purified gas leaves the apparatus through the gas outlet (2).

Figure 11:
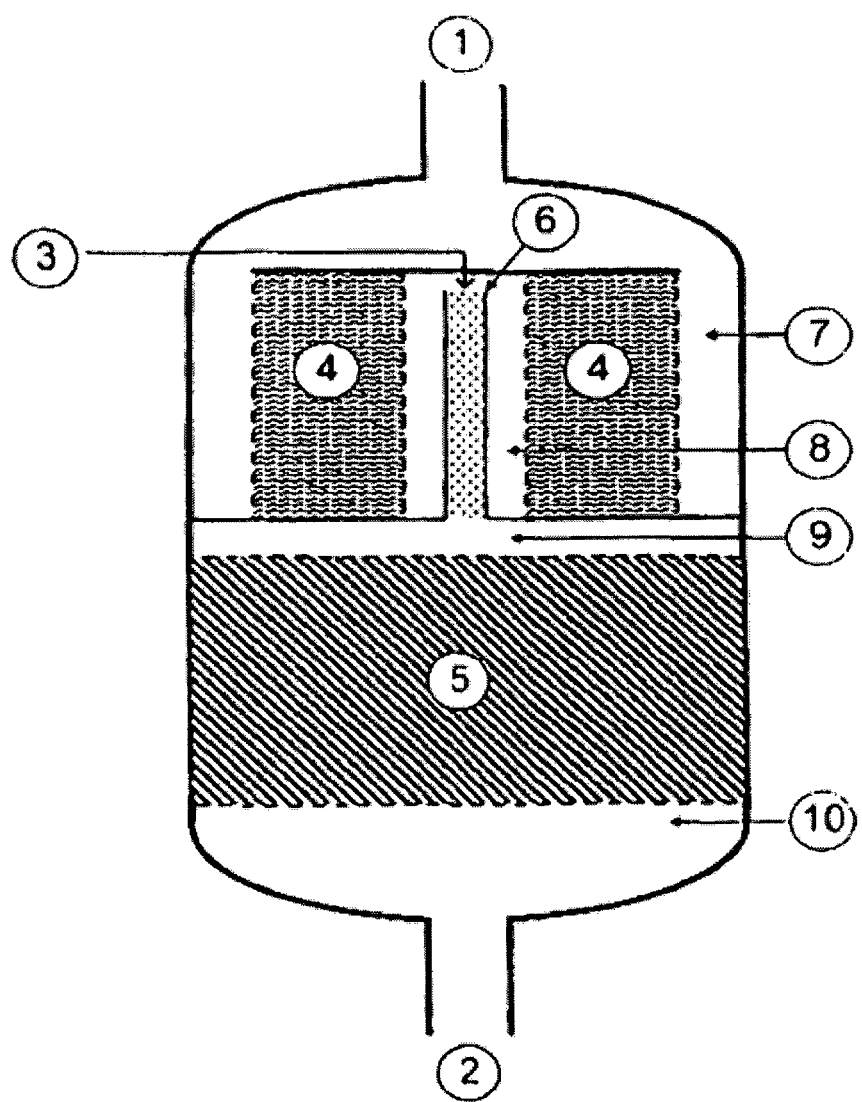
FIG. 11 illustrates a schematic depiction of a reactor according to still another embodiment of the invention.

FIG. 11 describes a similar configuration as shown in FIG. 5 with the modification that flow occurs radially through the first catalyst bed (4) and axially through the second catalyst bed (5). The other reference numerals have the meaning indicated in the description of FIG. 8.

It may be recognized by those of ordinary skill in the art that various advantages may result from the invention, in that:

the invention discloses a process which is easy to integrate into existing industrial plants;
conventional but complicated treatment of the exhaust air streams by means of acids or flares is no longer necessary;
complicated disposal of the salt solution as is obtained, for example, in an acid scrub becomes unnecessary, which is associated with a cost saving;
the invention provides for improved environmental friendliness by conversion of methane into carbon dioxide which is less damaging to the environment;
no operating materials or only small quantities of operating materials are necessary for carrying out the process; and
the oxidation-reduction process described herein can be carried out within one process step.

The described embodiment of the invention may self-evidently also be modified in a variety of aspects without departing from the basic concept.

LIST OF REFERENCE NUMERALS (FIGS. 1-5)

1 Untreated offgas stream
2 Offgas stream from the apparatus for the oxidation-reduction process
3 Feed mixture for the selective catalytic reduction
4 Substream of the untreated offgas stream
5 Apparatus for the oxidation-reduction process
6 Apparatus for the selective catalytic reduction
7 Purified offgas
8 Stream for addition of air or oxygen and/or reducing agent
9 Stream for addition of ammonia, aqueous ammonia or urea solution
10 Apparatus for selective oxidation
11 Offgas stream from the apparatus for selective oxidation
12 Stream for the optional addition of air or oxygen

The invention claimed is:

1. A combined oxidation and reduction process for the removal of ammonia, lower alkanes, and hydrogen from one or more offgas streams of a urea synthesis plant or of a fertilizer plant, comprising the steps of:
  (a) oxidizing the ammonia, the lower alkanes, and the hydrogen from the off gas stream of the urea synthesis or fertilizer plant into nitrogen, carbon dioxide and water by chemical reaction in an oxidation zone; and
  (b) reducing nitrogen oxides formed in step a) to form elemental nitrogen in a reduction zone;
wherein:
  the offgas stream containing ammonia, lower alkanes, and hydrogen is passed over one or more catalysts at a space velocity of approximately 5,000 to 50,000 $h^{-1}$;
  the oxygen content in the offgas stream is set so that the ammonia, the lower alkanes, and the hydrogen is firstly oxidized in the oxidation zone to form nitrogen, carbon dioxide and water and the nitrogen oxides formed are subsequently reduced in the reduction zone to form elemental nitrogen; and the combustion air ratio in the offgas to be treated is set to a value between approximately 0.7 and approximately 1.3 before entry into the catalysts, wherein:

in the case of a combustion air ratio of less than 1.0, the oxygen required for the oxidation is injected as one of pure substance or air into one or more of the offgas streams to be purified; and in the case of a combustion air ratio of greater than 1.0, the alkanes required for the reduction are injected into one or more of the offgas streams to be purified.

2. The process of claim 1, wherein the oxygen required for the oxidation is at least partly present in one or more of the offgas streams to be purified.

3. The process of claim 1, wherein the content of the oxygen required for the oxidation is set such that a combustion air ratio in the range of approximately 0.9 to approximately 1.1 is established.

4. The process of claim 1, wherein monitoring and setting of the combustion air ratio is carried out by one of: periodic sample analyses and continuous measurements.

5. The process of claim 1, wherein the one or more catalysts is selected from the group consisting of: palladium, platinum, rhodium, and mixtures of these compounds.

6. The process of claim 1, wherein the reduction-oxidation process is carried out first and is followed by a selective catalytic reduction in order to decrease the concentration of the nitrogen oxides which have been formed in the reduction-oxidation stage.

7. The process of claim 6, wherein one or more DeNOx catalysts for the selective catalytic reduction are selected from the group consisting of: catalysts containing elements from the group of transition metals, catalysts contain elements from the group of transition metal oxides, metallic platinum, gold, palladium, and mixtures of these compounds.

8. The process of claim 6, wherein the catalyst for the selective catalytic reduction is selected from the group consisting of: catalysts based on $SiO_2$, catalysts based on aluminosilicate, catalysts based on $Al_2O_3$, zeolite catalysts loaded with transition metals, and zeolites of the MFI type.

9. The process of claim 6, wherein a substream of the ammonia-containing offgas stream to be treated is fed directly to the selective catalytic reduction in order to reduce nitrogen oxides.

10. The process of claim 6, wherein a reducing agent selected from the group consisting of ammonia, aqueous ammonia, and urea solution is additionally injected into the offgas stream which contains nitrogen oxide and undergoes the selective catalytic reduction.

11. The process of claim 1, wherein a selective oxidation of ammonia is carried out before the reduction-oxidation process in order to lower the ammonia burden in the reduction-oxidation stage and thus reduce the nitrogen oxide emissions.

12. The process of claim 11, wherein one or more oxidation catalysts for the selective oxidation are selected from the group consisting of: catalysts based on SiO2, catalysts based on aluminosilicate, catalysts based on $Al_2O_3$, zeolite catalysts loaded with transition metals, and zeolites of the MFI type.

13. The process of claim 1, further comprising selective catalytic reduction and selective oxidation, wherein the selective oxidation occurs prior to steps (a) and (b), and the selective catalytic reduction occurs subsequent to steps (a) and (b).

* * * * *